United States Patent
Trainin et al.

(10) Patent No.: US 9,161,339 B2
(45) Date of Patent: *Oct. 13, 2015

(54) DEVICE, SYSTEM AND METHOD OF WIRELESS COMMUNICATION OVER NON-CONTIGUOUS CHANNELS

(71) Applicant: Intel Corporation, Santa Clara, CA (US)

(72) Inventors: Solomon Trainin, Haifa (IL); Assaf Kasher, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 14/049,365

(22) Filed: Oct. 9, 2013

(65) Prior Publication Data

US 2014/0036835 A1     Feb. 6, 2014

Related U.S. Application Data

(63) Continuation of application No. 12/787,825, filed on May 26, 2010, now Pat. No. 8,582,551.

(51) Int. Cl.
| | |
|---|---|
| *H04W 72/04* | (2009.01) |
| *H04L 5/00* | (2006.01) |
| *H04W 74/00* | (2009.01) |
| *H04W 74/08* | (2009.01) |

(52) U.S. Cl.
CPC .............. *H04W 72/04* (2013.01); *H04L 5/0048* (2013.01); *H04W 74/006* (2013.01); *H04W 72/042* (2013.01); *H04W 74/0833* (2013.01)

(58) Field of Classification Search
CPC . H04W 74/002; H04W 74/04; H04W 74/042; H04W 74/0406; H04W 74/0413; H04W 74/0833
See application file for complete search history.

(56) References Cited

U.S. PATENT DOCUMENTS

| | | | |
|---|---|---|---|
| 6,205,341 | B1 | 3/2001 | Monot et al. |
| 7,650,151 | B2 | 1/2010 | Medepalli et al. |
| 7,729,233 | B2 | 6/2010 | Webster et al. |
| 7,746,816 | B2 | 6/2010 | Attar et al. |
| 8,175,538 | B1 | 5/2012 | Chen et al. |
| 8,331,480 | B2 | 12/2012 | Zheng et al. |

(Continued)

FOREIGN PATENT DOCUMENTS

| | | |
|---|---|---|
| CN | 101473619 | 7/2009 |
| CN | 101548519 | 9/2009 |

(Continued)

OTHER PUBLICATIONS

Office Action for Chinese Patent Application No. 201110150683.5, mailed on Jun. 25, 2013, 23 pages, including 15 pages of English translation.

Office Action for Japanese Patent Application No. 2011103279, mailed on Jan. 8, 2013, 6 pages, including 3 pages of English translation.

International Search Report and Written Opinion for PCT Application No. PCT/US2011037425, mailed on Feb. 9, 2012, 13 pages.

(Continued)

*Primary Examiner* — Curtis A Alia
(74) *Attorney, Agent, or Firm* — Shichrur & Co.

(57) ABSTRACT

Some demonstrative embodiments include devices, systems and/or methods of wireless communication over non-contiguous channels. For example, a device may include a wireless communication unit capable of transmitting symbols of a wireless communication packet to a wireless communication device over a plurality of non-contiguous wireless communication channels.

14 Claims, 4 Drawing Sheets

(56) References Cited

U.S. PATENT DOCUMENTS

| | | |
|---|---|---|
| 2002/0075947 A1 | 6/2002 | Lai et al. |
| 2004/0114621 A1 | 6/2004 | Rotstein et al. |
| 2004/0163129 A1 | 8/2004 | Chapman et al. |
| 2005/0088959 A1 | 4/2005 | Kadous |
| 2005/0113041 A1 | 5/2005 | Polley et al. |
| 2005/0135284 A1 | 6/2005 | Nanda et al. |
| 2006/0062192 A1 | 3/2006 | Payne, III |
| 2006/0217071 A1 | 9/2006 | Russo et al. |
| 2006/0251183 A1 | 11/2006 | Soffer |
| 2008/0084938 A1 | 4/2008 | Li et al. |
| 2008/0137562 A1 | 6/2008 | Li et al. |
| 2009/0067403 A1 | 3/2009 | Chan et al. |
| 2009/0213815 A1 | 8/2009 | Sherman et al. |
| 2010/0091716 A1 | 4/2010 | Bonta et al. |
| 2010/0091894 A1 | 4/2010 | Maltsev et al. |
| 2010/0226291 A1 | 9/2010 | Gorbachov |
| 2010/0232385 A1* | 9/2010 | Hsu ............................ 370/329 |
| 2011/0171966 A1* | 7/2011 | Parkvall et al. ............. 455/450 |
| 2011/0292919 A1 | 12/2011 | Trainin et al. |

FOREIGN PATENT DOCUMENTS

| | | |
|---|---|---|
| EP | 1641179 | 3/2006 |
| JP | 2003101499 | 4/2003 |
| JP | 2010041581 | 2/2010 |
| JP | 2010534023 | 10/2010 |
| WO | 2004107680 | 12/2004 |
| WO | 2005002141 | 1/2005 |
| WO | 2007149961 | 12/2007 |
| WO | 2009010906 | 1/2009 |

OTHER PUBLICATIONS

International Preliminary Report on Patentability for PCT Application No. PCT/US2011037425, mailed on Dec. 6, 2012, 8 pages.

Office Action for U.S. Appl. No. 12/787,825, mailed on Sep. 19, 2012, 27 pages.

Final Office Action for U.S. Appl. No. 12/787,825, mailed on Feb. 4, 2013, 23 pages.

Office Action for U.S. Appl. No. 12/787,825, mailed on Apr. 19, 2013, 27 pages.

Natkaniec et al., "An Analysis of the Backoff Mechanism used in IEEE 802.11 Networks", 2000, 6 pages.

IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications.

Office Action for Chinese Patent Application No. 201110150683.5, mailed on Jan. 10, 2014, 22 pages, including 15 pages of English translation.

Office Action for Chinese Patent Application No. 201110150683.5, mailed on Jul. 1, 2014, 21 pages, including 15 pages of English translation.

Notice of Allowance for U.S. Appl. No. 12/787,825, mailed on Jul. 9, 2013, 16 pages.

Office Action for Chinese Patent Application No. 201110150683.5, mailed on Jun. 29, 2015, 25 pages, including 14 pages of English translation.

* cited by examiner

DEVICE, SYSTEM AND METHOD OF WIRELESS COMMUNICATION OVER NON-CONTIGUOUS CHANNELS

CROSS REFERENCE

This application is a Continuation Application of U.S. patent application Ser. No. 12/787,825 entitled "Device, System and Method of Wireless Communication Over Non-Contiguous Channels", filed May 26, 2010, the entire disclosure of which is incorporated herein by reference.

BACKGROUND

An increased throughput, e.g., above 1 Gigabit-per-second (Gbps) per wireless communication client, may be required in order, for example, to satisfy a demand for transferring increased amounts of data within wireless communication networks, such as, for example, wireless local area networks (WLAN) and/or wireless personal area networks (WPAN).

The increased throughput may be achieved, for example, by using a communication link having a wide bandwidth. For example, a bandwidth of more than 80 Mega-Hertz (MHz) may be required in order to provide a throughput greater than 1 Gbps, e.g., in a network operating over a frequency band of 5 Giga-Hertz (GHz) in accordance with the IEEE 802.11 standards.

A plurality of wireless communication channels may be required in order to achieve the high bandwidth. For example, more than four 20 MHz channels may be required, e.g., according to the IEEE 802.11 standards, in order to achiever a bandwidth of more than 80 MHz.

However, a likelihood of allocating a channel having a wide bandwidth may be relatively low due, for example, to interference, overlapping networks, regulatory limitations, and the like.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
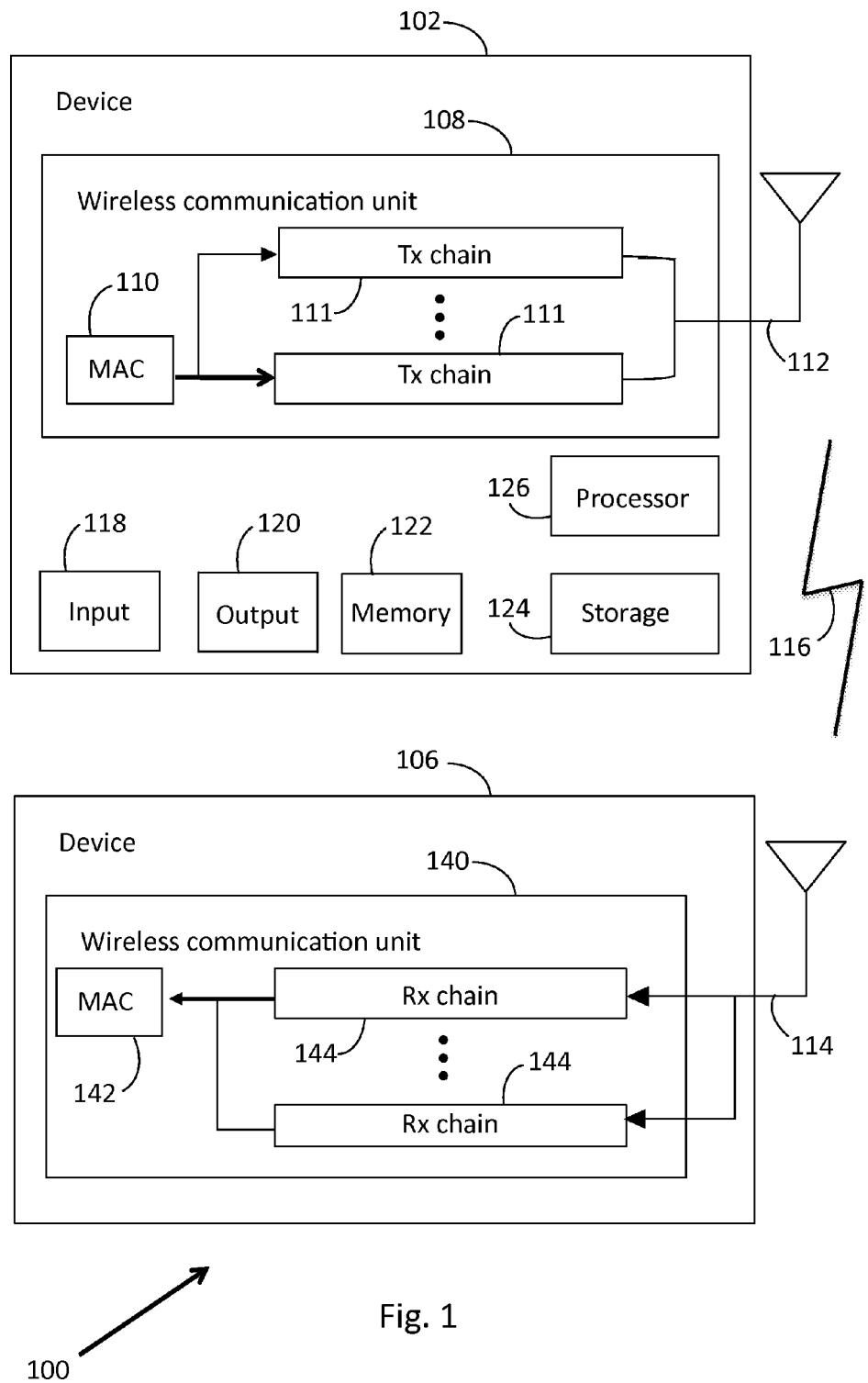
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 (*IEEE Standard for Information technology—Telecommunications and information exchange between systems—Local and metropolitan area networks—Specific requirements, Part 11: Wireless LAN Medium Access Control (MAC) and Physical Layer (PHY) Specifications—June 2007*), 802.11n, 802.11ac, 802.11 task group ad (TGad) ("the 802.11 standards"), 802.16 (*IEEE-Std 802.16, 2004 Edition, Air Interface for Fixed Broadband Wireless Access Systems*), 802.16d, 802.16e (*IEEE-Std 802.16e, 2005 Edition, Physical and Medium Access Control Layers for Combined Fixed and Mobile Operation in Licensed Bands*), 802.16f, 802.16m standards ("the 802.16 standards") and/or future versions and/or derivatives thereof, devices and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Reference is now made to FIG. 1, which schematically illustrates a block diagram of a system 100 in accordance with some demonstrative embodiments.

As shown in FIG. 1, in some demonstrative embodiments, system 100 may include one or more wireless communication devices, e.g., wireless communication devices 102 and/or 106, capable of communicating content, data, information and/or signals over a wireless communication link 116, e.g., as described in detail below. One or more elements of system 100 may optionally be capable of communicating over any suitable wired communication links.

In some demonstrative embodiments, wireless communication devices 102 and/or 106 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a handset, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, an AP, a base station, or the like.

In some demonstrative embodiments, device 102 may include a wireless communication unit 108 to transmit, via one or more antennae 112, a wireless transmission to device 106 over wireless communication link 116. Device 106 may include a wireless communication unit 140 to receive the wireless transmission via one or more antennae 114. Types of antennae that may be used for antennae 112 and/or 114 may include but are not limited to internal antenna, dipole antenna, omni-directional antenna, a monopole antenna, an end fed antenna, a circularly polarized antenna, a micro-strip antenna, a diversity antenna and the like.

In some demonstrative embodiments, wireless communication link 116 may have a bandwidth of at least 160 MegaHertz (MHz), e.g., as described below. In other embodiments, wireless communication link 116 may have any other suitable bandwidth.

In some demonstrative embodiments, wireless communication devices 102 and/or 106 may also include, for example, one or more of a processor 126, an input unit 118, an output unit 120, a memory unit 122, and a storage unit 124. Wireless communication devices 102 and/or 106 may optionally include other suitable hardware components and/or software components. In some demonstrative embodiments, some or all of the components of each of wireless communication devices 102 and/or 106 may be enclosed in a common housing or packaging, and may be interconnected or operably associated using one or more wired or wireless links. In other embodiments, components of each of wireless communication devices 102 and/or 106 may be distributed among multiple or separate devices.

Processor 126 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 126 executes instructions, for example, of an Operating System (OS) of wireless communication devices 102 and/or 106 and/or of one or more suitable applications.

Input unit 118 includes, for example, a keyboard, a keypad, a mouse, a touch-pad, a track-ball, a stylus, a microphone, or other suitable pointing device or input device. Output unit 120 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 122 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 124 includes, for example, a hard disk drive, a floppy disk drive, a Compact Disk (CD) drive, a CD-ROM drive, a DVD drive, or other suitable removable or non-removable storage units. Memory unit 122 and/or storage unit 124, for example, may store data processed by wireless communication device 102 and/or 106.

In some demonstrative embodiments, wireless communication link 116 may include a plurality of non-contiguous wireless communication channels.

The phrase "non-contiguous channels", as used herein, may refer to two or more wireless communication channels, which are not adjacent, neighboring, and/or bordering one another. In one example, first and second wireless communication channels may be non-contiguous if, for example, the first wireless communication channel is separated from the second wireless communication channel, e.g., by one or more other wireless communication channels, sub-channels, frequency bands, and the like.

In some demonstrative embodiments, at least one channel of the plurality of non-contiguous channels has a bandwidth at least 20 MHz, e.g., at least 80 MHz. In other embodiments, the non-contiguous wireless communication channels may have any other suitable bandwidth.

In one embodiment, wireless communication link 116 may include at least two non-contiguous channels, each having a bandwidth of 80 MHz, or any other bandwidth. In other embodiments, wireless communication link 116 may include any other suitable number of wireless communication channels, which may have any other suitable bandwidth.

Some demonstrative embodiments are described below with reference to a wireless communication link, e.g., wireless communication link 116, including two non-contiguous wireless communication channels having equal bandwidth, e.g., two 80 MHz channels. However, in other embodiments, the wireless communication link may include two or more non-contiguous wireless communication channels of different bandwidths. In one example, the wireless communication link may include at least one channel having a bandwidth of 80 MHz and at least one channel having a bandwidth different from 80 MHz, e.g., 20 MHz, 40 MHz, 120 MHz, 160 MHz and the like. In other embodiments, wireless communication link 116 may include any other suitable combination of two or more non-contiguous channels having any suitable bandwidth.

In some embodiments, wireless communication link 116 may include one or more additional channels, which may or may not be contiguous to one or more of non-contiguous channels. For example, wireless communication link 116 may include first and second non-contiguous 80 MHz channels, and a third channel, e.g., an 80 MHz channel, which may be contiguous to one of the first and second channels.

In some demonstrative embodiments, at least one channel of the plurality of non-contiguous channels may include two or more contiguous channels or sub-channels. For example, the 80 Mhz cannel may include four contiguous 20 MHz channels, e.g., in accordance with the 802.11 standards and/or any other suitable standard and/or protocol.

In some demonstrative embodiments, wireless communication unit 108 may include a plurality of transmit (Tx) chains 111 to transmit the wireless transmission over the plurality of wireless communication channels. Wireless communication unit 140 may include a plurality of receive (Rx) chains 144 to receive the wireless transmission over the plurality of wireless communication channels. For example, wireless communication unit 108 may include two Tx chains 111 to transmit the wireless transmission over two respective non-contiguous channels of link 116 and/or wireless communication unit 140 may include two Rx chains 144 to receive the wireless transmission over the two respective non-contiguous channels of link 116, e.g., as described in detail below.

In some demonstrative embodiments, Tx chains 111 and/or Rx chains 144 may include any suitable Physical-layer (PHY) chains and/or components; any suitable Radio-Frequency (RF) chains and/or components; and/or any other suitable elements.

In some demonstrative embodiments, wireless communication unit 108 may include a media-access-controller (MAC) 110, e.g., a single MAC, to commonly control the transmissions via Tx chains 111; and/or wireless communication unit 140 may include a MAC 142, e.g., a single MAC, to commonly control the reception via Rx chains 144, e.g., as described in detail below.

In some demonstrative embodiments, MAC 110 may control Tx chains 111 to simultaneously transmit symbols of a wireless communication packet over the plurality of non-contiguous wireless communication channels of wireless communication link 116. MAC 142 may control Rx chains 144 to simultaneously receive the symbols of the wireless communication packet over the plurality of non-contiguous wireless communication channels of wireless communication link 116.

In some demonstrative embodiments, wireless communication unit 108 may transmit to wireless communication unit 140 signaling information defining transmission characteristics over the plurality of non-contiguous channels of link 116, for example, as part of a preamble of the wireless communication packet, e.g., as described in detail below.

Figure 2:
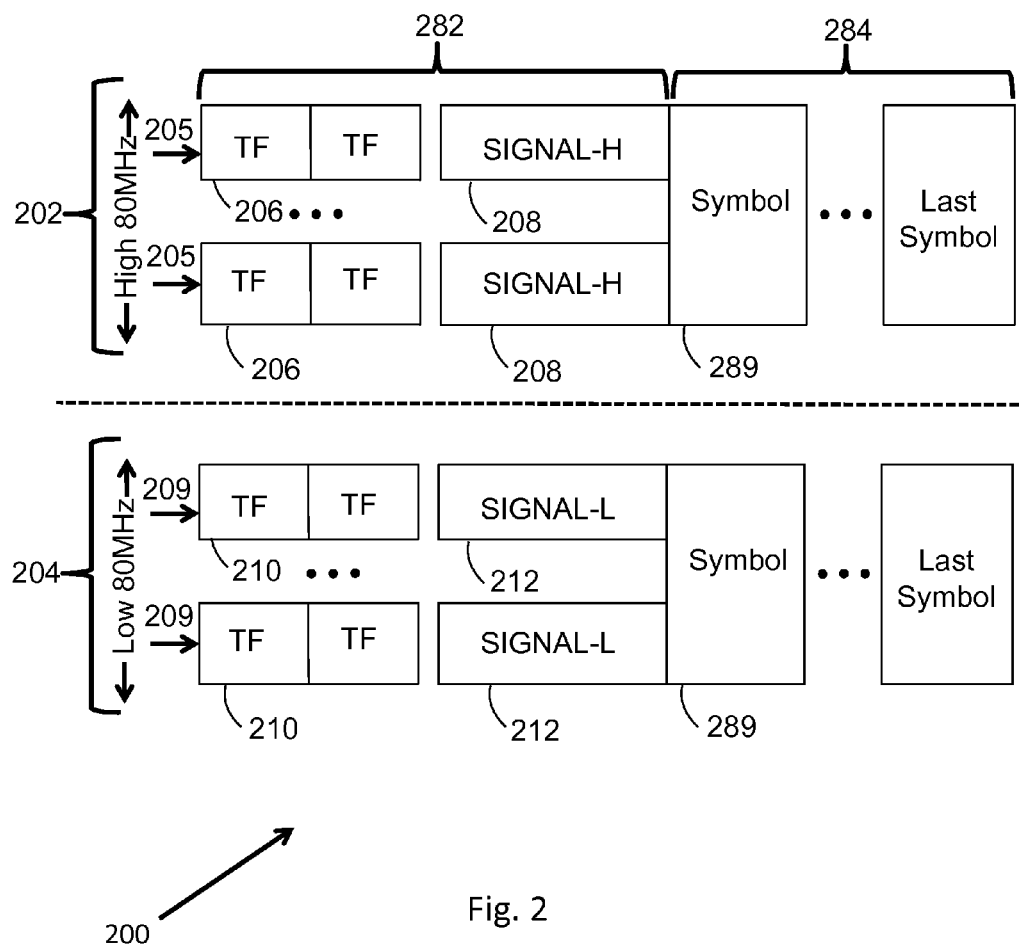
FIG. 2 is a schematic illustration of a transmission scheme of a wireless communication packet, in accordance with some demonstrative embodiments.

Reference is also made to FIG. 2, which schematically illustrates a transmission scheme of a wireless communication packet 200 over first and second non-contiguous wireless communication channels 202 and 204, respectively, in accordance with some demonstrative embodiments.

In some demonstrative embodiments, wireless communication channel 202 ("high channel" or "H channel") may include a spectrum of wireless communication frequencies, which may greater than a spectrum of wireless communication frequencies included within wireless communication channel 204 ("low channel" or "L channel").

In some demonstrative embodiments, wireless communication channels 202 and 204 may have the same bandwidth, e.g., 80 MHz. However, wireless communication channels 202 and 204 may have different bandwidths. In one example, one of wireless communication channels 202 and 204 may have a bandwidth of 80 MHz, while another of wireless communication channels 202 and 204 may have a bandwidth different from 80 MHz, e.g., 20 MHz, 40 MHz, 120 MHz, 160, MHz, and the like.

In some demonstrative embodiments, wireless communication channel 202 may include a plurality of contiguous channels or sub-channels 205; and/or wireless communication channel 204 may include a plurality of contiguous channels or sub-channels 209. For example, channels 205 and/or 209 may include four 20 MHz channels, e.g., in accordance with the 802.11 standards, and/or any other suitable channels.

In some demonstrative embodiments, wireless communication packet 200 may include a preamble portion 282 followed by a data portion 284.

In some demonstrative embodiments, preamble portion 282 may be transmitted separately and/or synchronously over each of channels 205 and 209. Data symbols 289 of packet 200 may be transmitted over non-contiguous channels 202 and 204, e.g., simultaneously.

In some demonstrative embodiments, preamble portion 282 may include first common preamble information transmitted over each of contiguous channels 205; and/or second common preamble information transmitted over each of contiguous channels 205. For example, a first plurality of training fields 206 may be transmitted over each of contiguous channels 205 and/or a second plurality of training fields 210, which may be similar to or different from training fields 206, may be transmitted over each of contiguous channels 206, e.g., in accordance with the 802.11 standards and/or any other suitable standard and/or protocol.

In some demonstrative embodiments, preamble portion 282 may include a first signaling filed 208 ("signal-H"), which may be transmitted over each of channels 205, and a second signaling filed 212 ("signal-L"), which may be transmitted over each of channels 209.

In some demonstrative embodiments, signaling field 208 may include first signaling information defining first transmission characteristics, e.g., of data portion 284 over wireless communication channel 202; and/or signaling field 212 may include second signaling information defining second transmission characteristics, e.g., of data portion 284, over wireless communication channel 204, e.g., as described below.

Figure 3:
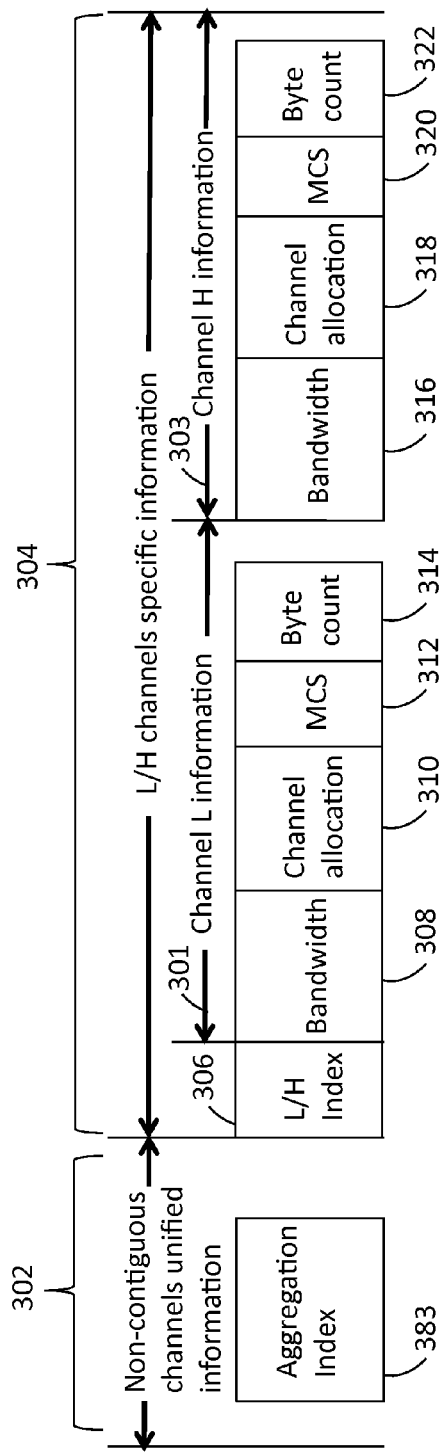
FIG. 3 is a schematic illustration of a signaling field, in accordance with one demonstrative embodiment.

In some demonstrative embodiments, signaling fields 208 and 212 may include signaling information ("unified signaling information"), which may be common and/or unified for both channels 202 and 204, For example, signaling fields 208 and 212 may include unified signaling information relating to general characteristics of the transmission of packet 200, for example, a type of the packet, information regarding an aggregation mechanism for transmitting packet 200, and the like, e.g., as described below with reference to FIGS. 3 and/or 4.

In some demonstrative embodiments, signaling fields 208 and 212 may include signaling information ("channel-specific signaling information"), which may be channel-specific, e.g., different signaling information, defining different transmission characteristics for channels 202 and 204. For example, signaling fields 208 and 212 may include channel-specific signaling information defining a different bandwidth, channel allocation, Modulation-Coding-Scheme (MCS), and/or byte-count to be used for channels 202 and 204, e.g., as described below with reference to FIGS. 3 and/or 4.

In some demonstrative embodiments, signaling field 208 may include information relating to channel 204, for example, an indication that data portion 284 is to be transmitted over channel 204 and/or at least partial information relating to channel 204; and/or field 212 may include information relating to channel 202, for example, an indication that data portion 284 is to be transmitted over channel 202 and/or at least partial information relating to channel 202.

In some demonstrative embodiments, signaling field 208 may also include an indication of one of channels 209, which may be used as a general primary channel of channel 204; and/or signaling field 212 may also include an indication of one of channels 205, which may be used as a general primary channel of channel 202, e.g., according to the 802.11 standards.

Reference is now made to FIG. 3, which schematically illustrates a signaling field 300, in accordance with one demonstrative embodiment. Signaling filed 300 may be transmitted as part of a preamble of a packet over at least first and second non-contiguous wireless communication channels. Signaling field 300 may include, for example, signaling field 208 and/or signaling field 212 (FIG. 2).

In some demonstrative embodiments, signaling field 300 may include a unified signaling information portion 302 including unified information relating to the non-contiguous channels, e.g., to both channels 202 and 204 (FIG. 2). For example, unified signaling information portion 302 may include an aggregation index 383 indicating whether or not the packet, which includes signaling filed 300, e.g., packet 200 (FIG. 2), is part of an aggregated transmission. Aggregation index 383 may have, for example, a first value, e.g., zero, to indicate that the packet includes an un-aggregated Mac-Protocol-Data-Unit (MPDU), or a second value, e.g., one, to indicate that the packet includes an Aggregated-MPDU (AMPDU), which may include a plurality of MPDUs, e.g., separated by a suitable delimiter. In some embodiments, the unified information may also include unified signaling information relating to transmission characteristics of the non-contiguous channels, e.g., a unified MCS and/or byte count.

In some demonstrative embodiments, signaling field 300 may include a channel-specific signaling information portion 304 including channel-specific signaling information relating to transmission characteristics of the non-contiguous channels, e.g., as described below.

In some demonstrative embodiments, channel-specific signaling information portion 304 may include signaling information relating to each of the non-contiguous channels. For example, channel-specific signaling information portion 304 may include information regarding each transmission characteristic for each of the non-contiguous wireless communication channels. Accordingly, substantially the same signaling information 300 may be transmitted over each of the non-contiguous wireless communication channels.

In some demonstrative embodiments, portion 304 may include an indicator 306 to indicate a wireless communication channel ("the current channel") over which signaling field 300 is being transmitted. For example, indicator 306 may include a value indicating whether signaling field 300 is being transmitted over channel 202 or channel 204 (FIG. 2). Indicator 306 may include, for example, a first value, e.g., one, to indicate that signaling filed 300 is being transmitted over the L channel, a second value, e.g., two, to indicate that signaling filed 300 is being transmitted over the H channel, or a third value, e.g., zero, to indicate that signaling field 300 is being transmitted as part of a packet transmitted over contiguous channels.

In some demonstrative embodiments, portion 304 may also include first channel-specific signaling information 301 relating to a first channel of the non-contiguous channels, e.g., the current channel. For example, first channel-specific signaling information 301 may include signaling information relating to the H channel, e.g., if indicator 306 indicates that signaling filed 300 is being transmitted over the H channel; or signaling information relating to the L channel, e.g., if indicator 306 indicates that signaling filed 300 is being transmitted over the L channel.

In some demonstrative embodiments, portion 304 may also include at least second channel-specific signaling information 303 relating to at least a second respective channel of the non-contiguous channels, e.g., other than the current channel. For example, second channel-specific signaling information 303 may include signaling information relating to the L channel, e.g., if indicator 306 indicates that signaling filed 300 is being transmitted over the H channel; or signaling information relating to the H channel, e.g., if indicator 306 indicates that signaling filed 300 is being transmitted over the L channel.

In some demonstrative embodiments, signaling information 301 may define first transmission characteristics over the first wireless communication channel. For example, signaling information 301 may include bandwidth information 308 defining a bandwidth of the current channel; channel allocation information 310 defining an allocation of the current channel; MCS information 312 defining an MCS of the current channel; byte count information 314 defining a size relating to the packet, e.g., a total size of the packet payload or a size of the part of packet 200 (FIG. 2) delivered over the current channel; and/or any other suitable information defining any other suitable transmission characteristics over the current channel.

In some demonstrative embodiments, signaling information 303 may define second transmission characteristics over the second wireless communication channel. For example, signaling information 303 may include bandwidth information 316 defining a bandwidth of the second channel; channel allocation information 318 defining an allocation of the second channel; MCS information 320 defining an MCS of the second channel; byte count information 322 defining a size relating to the packet, e.g., a total size of the packet payload or a size of the part of packet 200 (FIG. 2) delivered over the second channel; and/or any other suitable information defining any other suitable transmission characteristics over the second channel.

FIG. 3 shows signaling field 300 including only first and second channel-specific signaling information elements, e.g., signaling information elements 301 and 303, corresponding to a wireless communication link including first and second non-contiguous wireless communication channels, respectively. However, in other embodiments, signaling field 300 may include any other suitable number, e.g., greater than two, of channel-specific information elements corresponding to a respective number of wireless communication channels.

Figure 4:
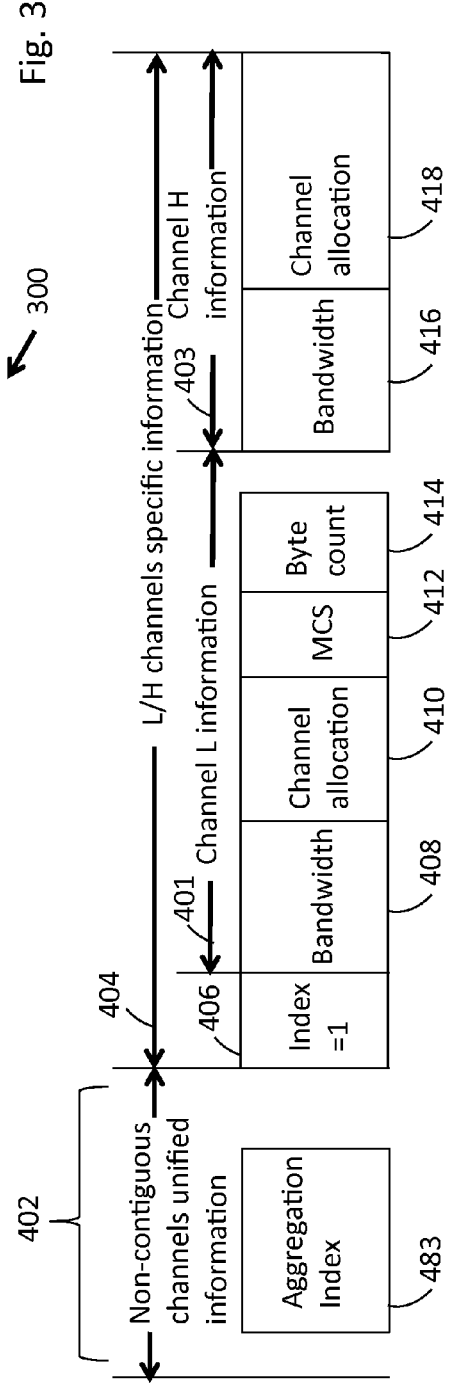
FIG. 4 is a schematic illustration of a signaling field, in accordance with another demonstrative embodiment.

Reference is now made to FIG. 4, which schematically illustrates a signaling field 400, in accordance with another demonstrative embodiment. Signaling filed 400 may be transmitted as part of a preamble of a packet transmitted over at least first and second non-contiguous wireless communication channels. Signaling field 400 may include, for example, signaling field 208 and/or signaling field 212 (FIG. 2).

In some demonstrative embodiments, signaling field 400 may include a unified signaling information portion 402 including unified signaling information relating to the non-contiguous channels, e.g., to both channels 202 and 204 (FIG. 2). For example, unified-signaling information portion 402 may include an aggregation index 483 indicating whether or not the packet, which includes signaling filed 400, e.g., packet 200 (FIG. 2), is part of an aggregated transmission. Aggregation index 483 may have, for example, a first value, e.g., zero, to indicate that the packet is transmitted as part of an un-aggregated MPDU, or a second value, e.g., one, to indicate that the packet is transmitted as part of an AMPDU.

In some demonstrative embodiments, signaling field 400 may include a channel-specific signaling information portion 404 including channel-specific signaling information relating to transmission characteristics of the non-contiguous channels, e.g., as described below.

In some demonstrative embodiments, channel-specific information portion 404 may include information relating to a wireless communication channel ("the current channel") over which signaling field 400 is being transmitted, and at least partial signaling information relating to each of the other non-contiguous channels. For example, channel-specific information portion 404 may include information regarding transmission characteristics for the current channel and at least partial information relating to each of the other channels. The signaling information relating to the other channels may include, for example, information enabling a device receiving signaling field over the current channel to determine and/or identify the one or more other non-contiguous channels. Accordingly, different signaling information 400 may be transmitted over each of the non-contiguous wireless communication channels.

In some demonstrative embodiments, portion 404 may include an indicator 406 to indicate the current channel. For example, indicator 406 may include a value indicating whether signaling field 400 is being transmitted over channel 202 or channel 204 (FIG. 2). Indicator 406 may include, for example, a first value, e.g., one, to indicate that signaling filed 400 is being transmitted over the L channel, a second value, e.g., two, to indicate that signaling filed 400 is being transmitted over the H channel, or a third value, e.g., zero, to indicate that signaling field 400 is being transmitted as part of a packet transmitted over contiguous channels.

In some demonstrative embodiments, portion 404 may also include first channel-specific signaling information 401 relating to a first channel of the non-contiguous channels, e.g., the current channel. For example, first channel-specific signaling information 401 may include information relating to the H channel, e.g., if indicator 406 indicates that signaling filed 400 is being transmitted over the H channel; or signaling information relating to the L channel, e.g., if indicator 406 indicates that signaling filed 400 is being transmitted over the L channel.

In some demonstrative embodiments, portion 404 may also include at least second channel-specific signaling information 403 relating to at least a second respective channel of the non-contiguous channels, e.g., other than the current channel. For example, second channel-specific signaling information 403 may include signaling information relating to the L channel, e.g., if indicator 306 indicates that signaling filed 400 is being transmitted over the H channel; or signaling information relating to the H channel, e.g., if indicator 406 indicates that signaling filed 400 is being transmitted over the L channel.

In some demonstrative embodiments, signaling information 401 may define first transmission characteristics over the first wireless communication channel. For example, signaling information 401 may include bandwidth information 408 defining a bandwidth of the current channel; channel allocation information 410 defining an allocation of the current channel; MCS information 412 defining an MCS of the current channel; byte count information 414 defining a size relating to the packet, e.g., a total size of the packet payload or a size of the part of packet 200 (FIG. 2) delivered over the current channel; and/or any other suitable information defining any other suitable transmission characteristics over the current channel.

In some demonstrative embodiments, signaling information 403 may define at least some second transmission characteristics over the second wireless communication channel, for example, for example, information enabling a device receiving signaling field 400 over the current channel to determine and/or identify the second non-contiguous channel. For example, second channel-specific information 403 may include bandwidth information 416 defining a bandwidth of the second channel, channel allocation information 418 defining an allocation of the second channel and/or any other suitable information defining any other suitable transmission characteristics over the second channel.

FIG. 4 shows signaling filed 400 including only first and second channel-specific signaling information elements, e.g., signaling information elements 401 and 403, corresponding to a wireless communication link including first and second non-contiguous wireless communication channels, respectively. However, in other embodiments, signaling field 400 may include any other suitable number, e.g., greater than two, of channel-specific signaling information elements corresponding to a respective number of wireless communication channels. For example, signaling field 400 may include signaling information element 401 corresponding to the current channel and a plurality of signaling information elements 403 corresponding to a respective plurality of non-contiguous channels.

Referring back to FIG. 1, in some demonstrative embodiments, wireless communication unit 108 may transmit at least first signaling information over channel 202 (FIG. 2), e.g., as part of signaling field 208 (FIG. 2), defining first transmission characteristics over channel 202 (FIG. 2). Wireless communication unit 108 may transmit at least second signaling information over channel 204 (FIG. 2), e.g., as part of signaling field 210 (FIG. 2), defining second transmission characteristics over channel 204 (FIG. 2).

In some demonstrative embodiments, the first and second transmission characteristics may be independent of one another such that, for example, one or more of the first transmission characteristics may be selected, defined, set and/or determined independently of one or more of the second transmission characteristics, and vice versa. For example, MAC 110 may select, define, set and/or determine the bandwidth, allocation, MCS, byte count and/or any other parameter and/or mechanism of the transmission data portion 284 (FIG. 2) over channel 202 (FIG. 2) independently of the bandwidth, allocation, MCS, byte count and/or any other parameter and/or mechanism, respectively, of the transmission of data portion 284 (FIG. 2) over channel 204 (FIG. 2). For example, if channel 202 (FIG. 2) has a first MCS, then MAC 110 may independently select, define, set and/or determine the MCS of channel 204 (FIG. 2), e.g., to be equal to or different from the first MCS.

In some demonstrative embodiments, wireless communication unit 108 may transmit to wireless communication unit 140 at least part of the second signaling information over channel 202 (FIG. 2), and at least part of the first signaling information over channel 204 (FIG. 2), e.g., as described in detail below.

In some demonstrative embodiments, wireless communication unit 108 may transmit over each of channels 202 and 204 (FIG. 2) substantially the same signaling information including both the first and second channel-specific signaling information, e.g., as described above with reference to FIG. 3.

In some demonstrative embodiments, wireless communication unit 108 may transmit different signaling information over channels 202 and 204 (FIG. 2). For example, wireless communication unit 108 may transmit only part of the second signaling information over channel 202 (FIG. 2) and/or only part of the first signaling information over channel 204 (FIG. 2). For example, wireless communication unit 108 may transmit over channel 204 (FIG. 2) at least one of a bandwidth of channel 202 (FIG. 2) and channel allocation information corresponding to channel 202 (FIG. 2); and/or transmit over channel 202 (FIG. 2) at least one of a bandwidth of channel 204 (FIG. 2) and channel allocation information corresponding to channel 204 (FIG. 2), e.g., as described above with reference to FIG. 4.

In some demonstrative embodiments, MAC 110 may implement a suitable Carrier Sense Multiple Access (CSMA) mechanism, e.g., a suitable collision-avoidance CSMA (CSMA/CA) mechanism, for communicating over wireless communication link 116. The CSMA mechanism may include a suitable back-off mechanism, e.g., in accordance with the 802.11 standards and/or any other suitable standard and/or protocol.

In some demonstrative embodiments, MAC 110 may utilize a plurality of back-off mechanisms for communicating over the plurality of non-contiguous channels of wireless communication link 116. For example, MAC 110 may communicate over a first channel of the plurality of channels, e.g., channel 202 (FIG. 2), according to a first back-off mechanism and over a second channel of the plurality of channels, e.g., channel 204 (FIG. 2), according to a second back-off mechanism. For example, MAC 110 may manage and/or countdown first and second, e.g., different, back-off periods over the first and second channels, respectively.

In some demonstrative embodiments, MAC 110 may manage the first back-off mechanism over a primary channel, e.g., a channel of channels 205 (FIG. 2), belonging to channel 202 (FIG. 2); and/or MAC 110 may manage the second back-off mechanism over a primary channel, e.g., a channel of channels 209 (FIG. 2), belonging to channel 204 (FIG. 2)

In one embodiment, the first and second back-off mechanisms may be identical, e.g., utilizing one or more identical back-off parameters, e.g., contention window parameters, and the like. In another embodiment, the first and second back-off mechanisms may be different from on another, e.g., utilizing one or more different back-off parameters, e.g., contention window parameters, and the like.

In some demonstrative embodiments, after a back-off period of the first back-off mechanism is complete, MAC 110 wait up to a predefined time period, denoted $\Delta 1$, for a back-off period of the second back-off mechanism to complete, prior to transmitting over the first channel. After the back-off period of the second back-off mechanism is complete, MAC 110 wait up to a predefined time period, denoted $\Delta 2$, for the back-off period of the first back-off mechanism to complete, prior to transmitting over the second channel. In one embodiment, the time period $\Delta 1$ may be equal to the time period $\Delta 2$. In another embodiment, the time period $\Delta 1$ may be different from the time period $\Delta 2$.

In some demonstrative embodiments, if the back-off period of the second back-off mechanism is complete within the predefined time period $\Delta 1$, MAC 110 may transmit over both the first and second channels.

In some demonstrative embodiments, MAC 110 may restart a back-off counter of the first back-off mechanism and a back-off counter of the second back-off mechanism after completing the transmission in both the first and second channels.

In some demonstrative embodiments, if the back-off period of the second back-off mechanism is not completed within the predefined time period $\Delta 1$, MAC 110 may transmit, for example, only over the first channel.

In some demonstrative embodiments, MAC 110 may restart the back-off counter of the first back-off mechanism and the back-off counter of the second back-off mechanism after completing the transmission in the first channel.

Figure 5:
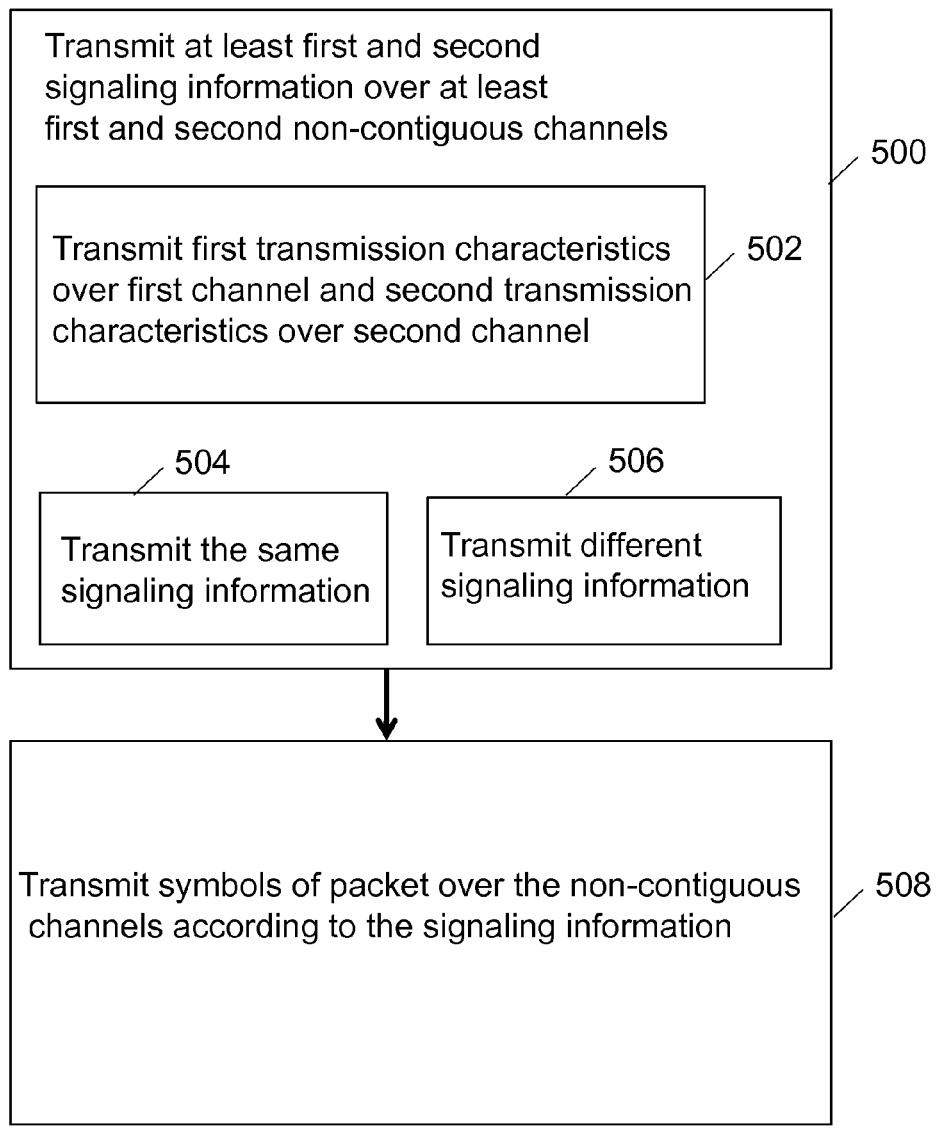
FIG. 5 is a schematic flow-chart illustration of a method of wireless communication over non-contiguous channels, in accordance with some demonstrative embodiments.

Reference is made to FIG. 5, which schematically illustrates a method of wireless communication over non-contiguous channels. In some embodiments, one or more operations of the method of FIG. 5 may be performed by one or more elements of a system, e.g., system 100 (FIG. 1), for example, device 102 (FIG. 2), wireless communication unit 108 (FIG. 1) and/or MAC 110 (FIG. 1).

As indicated at block 500, the method may include transmitting at least first and second signaling information over at least first and second non-contiguous channels, respectively. For example, wireless communication unit 108 (FIG. 1) may transmit signal fields 208 and 212 (FIG. 2) over non-contiguous wireless communication channels 202 and 204 (FIG. 2), respectively, e.g., as described above.

As indicated at block 502, transmitting the first and second signaling information may include transmitting first signaling information defining first transmission characteristics over the first channel, and second signaling information defining second transmission characteristics, independent of the first transmission characteristics, over the second channel. For example, wireless communication unit 108 (FIG. 1) may transmit signaling information fields 300 (FIG. 3) and/or 400 (FIG. 4) over channels 202 and/or 204 (FIG. 2), e.g., as described above.

As indicated at block 504, transmitting the first and second signaling information may include transmitting the substantially same signaling information over both the first and second non-contiguous channels. For example, wireless communication unit 108 (FIG. 1) may transmit signaling field 300 (FIG. 3) including signaling information elements 301 and 303 (FIG. 3) over each of channels 202 and 204 (FIG. 1), e.g., as described above.

As indicated at block 506, transmitting the first and second signaling information may include transmitting different signaling information over the first and second wireless communication channels. For example, wireless communication unit 108 (FIG. 1) may transmit over channel 202 (FIG. 2) signaling field 400 (FIG. 4) including signaling information element 401 (FIG. 1) relating to channel 202 (FIG. 2) and signaling information element 403 (FIG. 1) relating to channel 204 (FIG. 2); and wireless communication unit 108 (FIG. 1) may transmit over channel 204 (FIG. 2) signaling field 400 (FIG. 4) including signaling information element 401 (FIG. 1) relating to channel 204 (FIG. 2) and signaling information element 403 (FIG. 1) relating to channel 202 (FIG. 2), e.g., as described above.

As indicated at block 508, the method may include transmitting symbols of a wireless communication packet over the first and second channels, according to the first and second transmission characteristics, respectively. For example, wireless communication unit 108 (FIG. 1) may transmit data portion 284 (FIG. 2) over channels 202 and 204 (FIG. 2), e.g., as described above.

Figure 6:
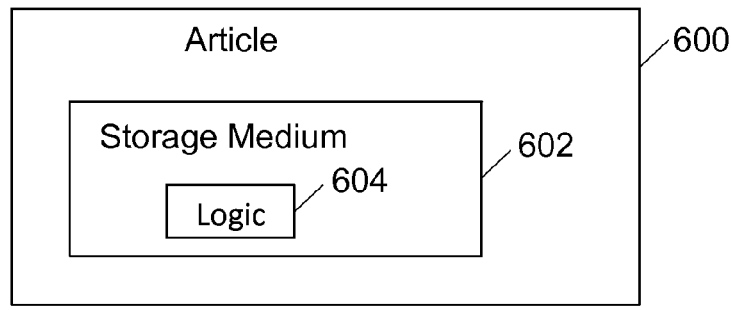
FIG. 6 is a schematic illustration of an article of manufacture, in accordance with some demonstrative embodiments.

Reference is made to FIG. 6, which schematically illustrates an article of manufacture 600, in accordance with some demonstrative embodiments. Article 600 may include a machine-readable storage medium 602 to store logic 604, which may be used, for example, to perform at least part of the functionality of MAC 110 (FIG. 1) and/or to perform one or more operations of the method of FIG. 5.

In some demonstrative embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A product including a non-transitory storage medium having stored thereon instructions that, when executed by a machine, result in:
   transmitting over a first channel of a plurality of non-contiguous channels at least first signaling information defining first transmission characteristics over the first channel, and transmitting over a second channel of the plurality of non-contiguous channels at least second signaling information defining second transmission characteristics over the second channel, the first signaling information including at least one type of information selected from the group consisting of a bandwidth of the first channel and channel allocation information corresponding to the first channel; and
   transmitting symbols of a wireless communication packet over the first and second channels according to the first and second transmission characteristics, respectively.

2. The product of claim 1, wherein the instructions result in:
   transmitting over the first channel at least part of the second signaling information; and
   transmitting over the second channel at least part of the first signaling information.

3. The product of claim 1, wherein transmitting the first and second signaling information includes transmitting substantially the same signaling information over both the first and second non-contiguous channels.

4. The product of claim 1, wherein transmitting the first and second signaling information includes transmitting different signaling information over the first and second wireless communication channels.

5. The product of claim 1, wherein said instructions result in transmitting said first and second signaling information as part of a preamble of said wireless communication packet.

6. The product of claim 1, wherein said instructions result in transmitting over the first channel first and second information elements including the first and second signaling information, respectively.

7. The product of claim 6, wherein said instructions result in transmitting the first and second information elements over the second channel.

8. The product of claim 1, wherein the first channel includes a first 80 Megahertz (MHz) channel and the second channel includes a second 80 MHz channel.

9. The product of claim 1, wherein the instructions result in communicating over the first channel according to a first back-off mechanism, and communicating over the second channel according to a second back-off mechanism.

10. The product of claim 9, wherein the instructions result in, when a back-off period of the first back-off mechanism is complete, waiting up to a predefined time period for a back-off period of the second back-off mechanism to complete, prior to transmitting over the first channel.

11. The product of claim 10, wherein the instructions result in, when the back-off period of the second back-off mechanism is complete within the predefined time period, transmitting over both the first and second channels.

12. The product of claim 1, wherein at least one channel of the plurality of channels includes two or more contiguous channels, and wherein the instructions result in transmitting a common preamble of the packet over the contiguous channels.

13. The product of claim 1, wherein at least one channel of the plurality of channels has a bandwidth of at least 20 megahertz (MHz).

14. The product of claim 1, wherein the plurality of channels have a total bandwidth of at least 160 megahertz (MHz).

* * * * *